United States Patent
Imai

Patent Number: 5,579,483
Date of Patent: Nov. 26, 1996

[54] COMMUNICATION CONTROLLER FOR CONTROLLING MULTI-CHANNEL MULTIPLEX COMMUNICATION AND HAVING CHANNEL SELECTION FUNCTIONS AND MEMORY FOR STORING COMMUNICATION CONTROL DATA FOR EACH CHANNEL

[75] Inventor: Shunji Imai, Hyogo-ken, Japan

[73] Assignee: Mitsubishi Denki Kabushiki Kaisha, Tokyo, Japan

[21] Appl. No.: 432,009

[22] Filed: May 1, 1995

Related U.S. Application Data

[63] Continuation of Ser. No. 55,250, May 3, 1993, abandoned.

[30] Foreign Application Priority Data

May 8, 1992 [JP] Japan .................... 4-116031

[51] Int. Cl.$^6$ .................... G06F 13/00
[52] U.S. Cl. .................... 395/200.01
[58] Field of Search .................... 364/DIG. 1 MS File, 364/DIG. 2 MS File; 395/200.01, 200.1, 375, 500, 800; 350/96.2; 370/16, 55, 35, 45, 53, 54, 87, 88, 89, 86, 90, 91

[56] References Cited

U.S. PATENT DOCUMENTS

| | | | |
|---|---|---|---|
| 4,539,655 | 9/1985 | Trussell et al. | 395/325 |
| 4,773,043 | 9/1988 | Kesler | 395/250 |
| 4,787,028 | 11/1988 | Finfrock et al. | 395/325 |
| 5,056,090 | 10/1991 | Kubota | 371/82 |

FOREIGN PATENT DOCUMENTS

| | | |
|---|---|---|
| 60-257636 | 12/1985 | Japan . |
| 283759 | 3/1990 | Japan . |

OTHER PUBLICATIONS

S. Das et al., electrical Communication, "Digital Signal Processor for Telecommunication Applications", vol. 59, No. 3, 1984, Harlow, pp. 320–326.

*Primary Examiner*—Robert B. Harrell
*Attorney, Agent, or Firm*—Rothwell, Figg, Ernst & Kurz

[57] ABSTRACT

Multiplexed data lines are separated and data lines are multiplexed by a channel number obtained. The memory for storing control/condition information and transmission/reception data for each channel is provided as a periphery of the communication controller and the communication processing unit processes data so that past information is read, modified and re-stored sequentially each time a channel number is input.

2 Claims, 7 Drawing Sheets

TO FIG. 4(b)

COMMUNICATION CONTROLLER FOR CONTROLLING MULTI-CHANNEL MULTIPLEX COMMUNICATION AND HAVING CHANNEL SELECTION FUNCTIONS AND MEMORY FOR STORING COMMUNICATION CONTROL DATA FOR EACH CHANNEL

This is a continuation of application Ser. No. 08/055,250, filed May 3, 1993, now abandoned.

BACKGROUND OF THE INVENTION

1. Field of the Invention

The present invention relates to a communication controller for multiplex communication based on SDLC and HDLC protocols.

2. Description of the Prior Art

Referring to FIG. 7, there is shown a prior art serial communication controller in which data lines (TXD, RXD) are not multiplexed. Referring to FIG. 8, there is also shown a prior art serial communication controller which has two channels, but the data lines of channels A and B are separated from each other.

A description is subsequently given of the operation of these controllers. The communication controller shown in FIG. 7 outputs transmission data (TXD) and receives reception data (RXD) in synchronism with a clock (CLK). Moreover, data are written and read by a CPU.

The communication controller shown in FIG. 8 has two data lines for each of transmission data and reception data but the operation is the same as above.

Since the prior art communication controllers are structured as described above, it is necessary to increase the number of circuits having the same configuration as the number of channels grows in order to handle a large number of channels. Since the number of LSIs must be increased, these communication controllers have such problems as an increase in the amount of hardwares and a rise in costs. They also have the problem that the CPU bus is used exclusively for DMA (Direct Memory Access) in order to transfer data from an external memory with the result of lowered performance of the device.

SUMMARY OF THE INVENTION

The present invention is intended to solve the above problems, and it is an object of the invention to effect multi-channel multiplex communication with less hardware.

A communication controller according to the present invention performs multi-channel serial communication by providing a shared section corresponding to a low-order layer of a communication protocol and a memory which stores control/condition information and transmission/reception data for each channel.

Furthermore, the communication controller enables CPU data to be directly accessed from the memory.

The multi-channel multiplex communication controller of the invention reads information such as transmission/reception data for a channel selected by an input channel number from the memory, processes the transmission/reception of the read data, outputs transmission data for the selected input channel number and stores the reception data in memory.

The above and other objects, features and advantages of the invention will become more apparent from the following description when taken in conjunction with the accompanying drawings.

DESCRIPTION OF THE PREFERRED EMBODIMENT

Embodiment 1

Figure 1:
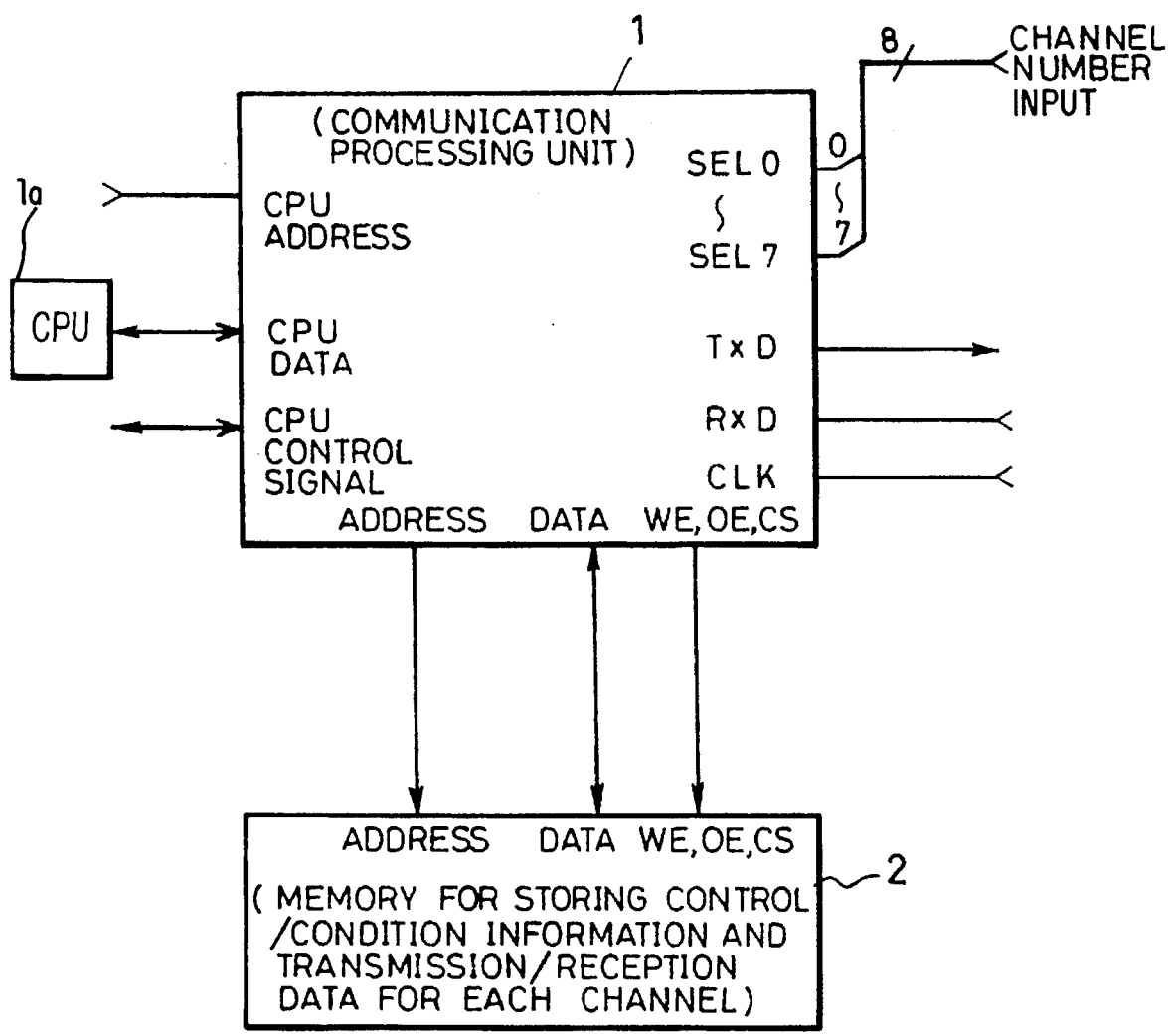
FIG. 1 is a diagram showing the configuration of a multi-channel multiplex communication controller according to an embodiment of the present invention.
Figure 2:
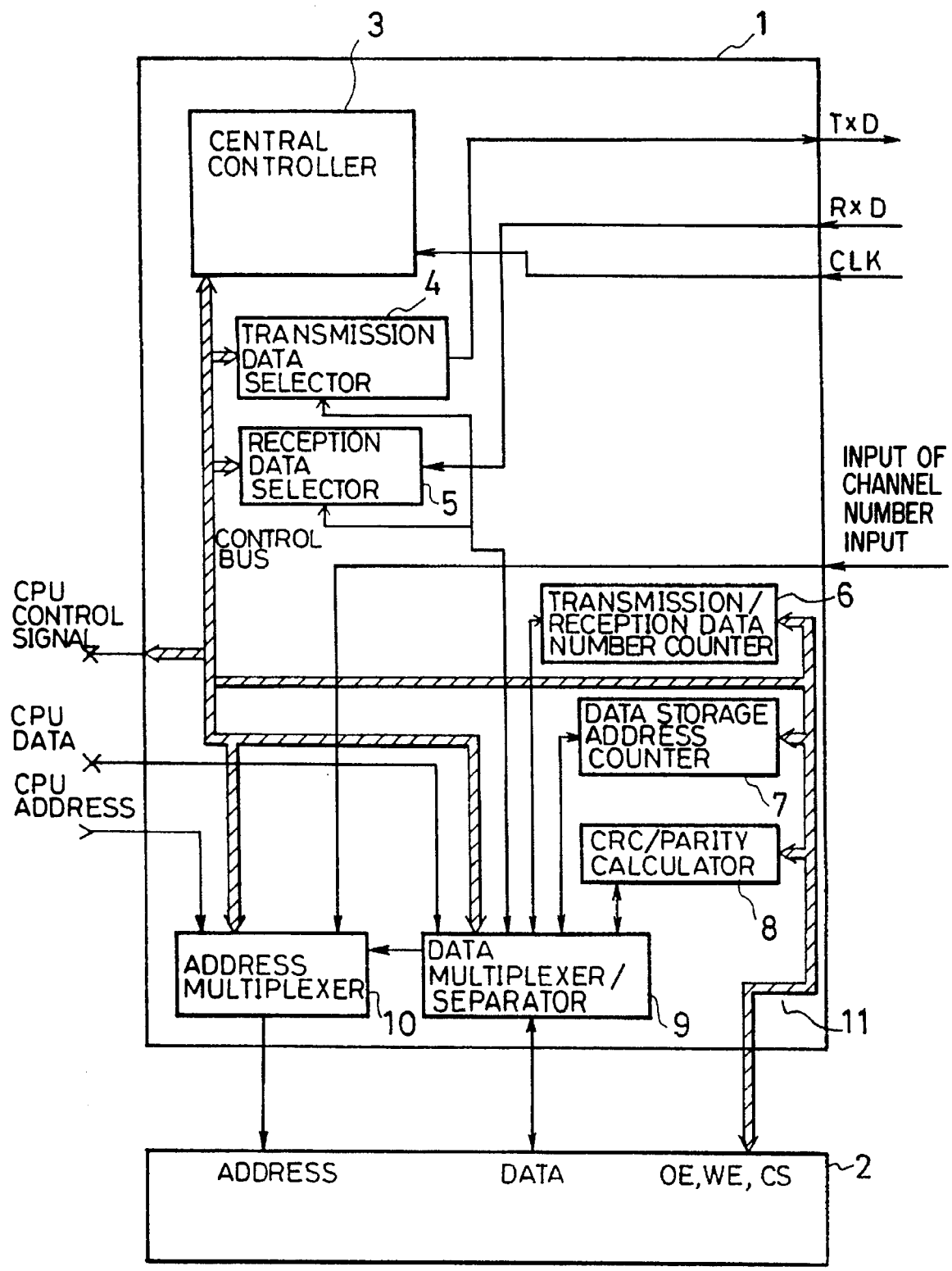
FIG. 2 is a block diagram of the multi-channel multiplex communication controller according to the embodiment.
Figure 3:
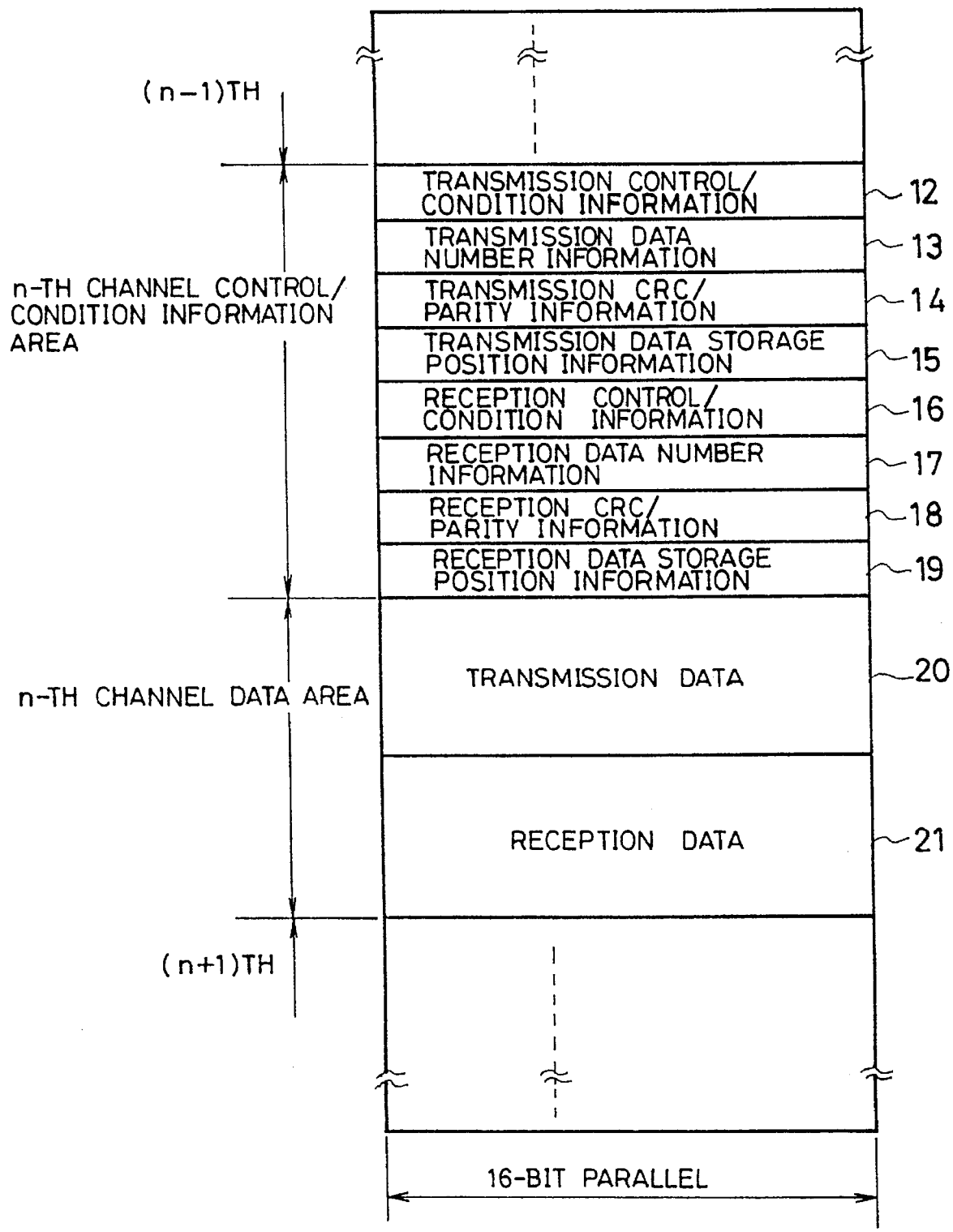
FIG. 3 is a diagram showing the internal configuration of the information storage memory of the embodiment.
Figure 4A:
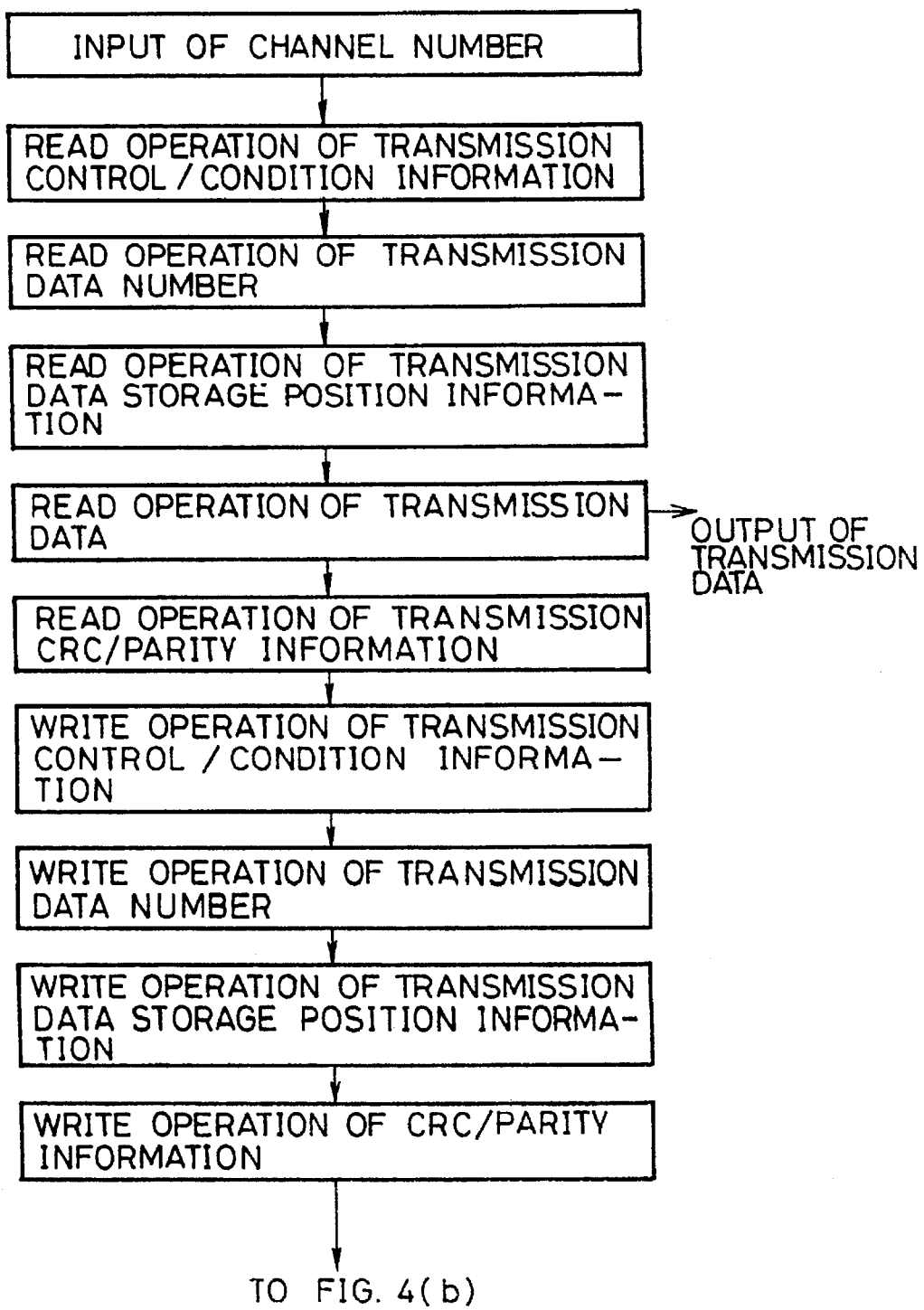
FIG. 4(a) is a diagram explaining an operation sequence of the embodiment.
Figure 4:
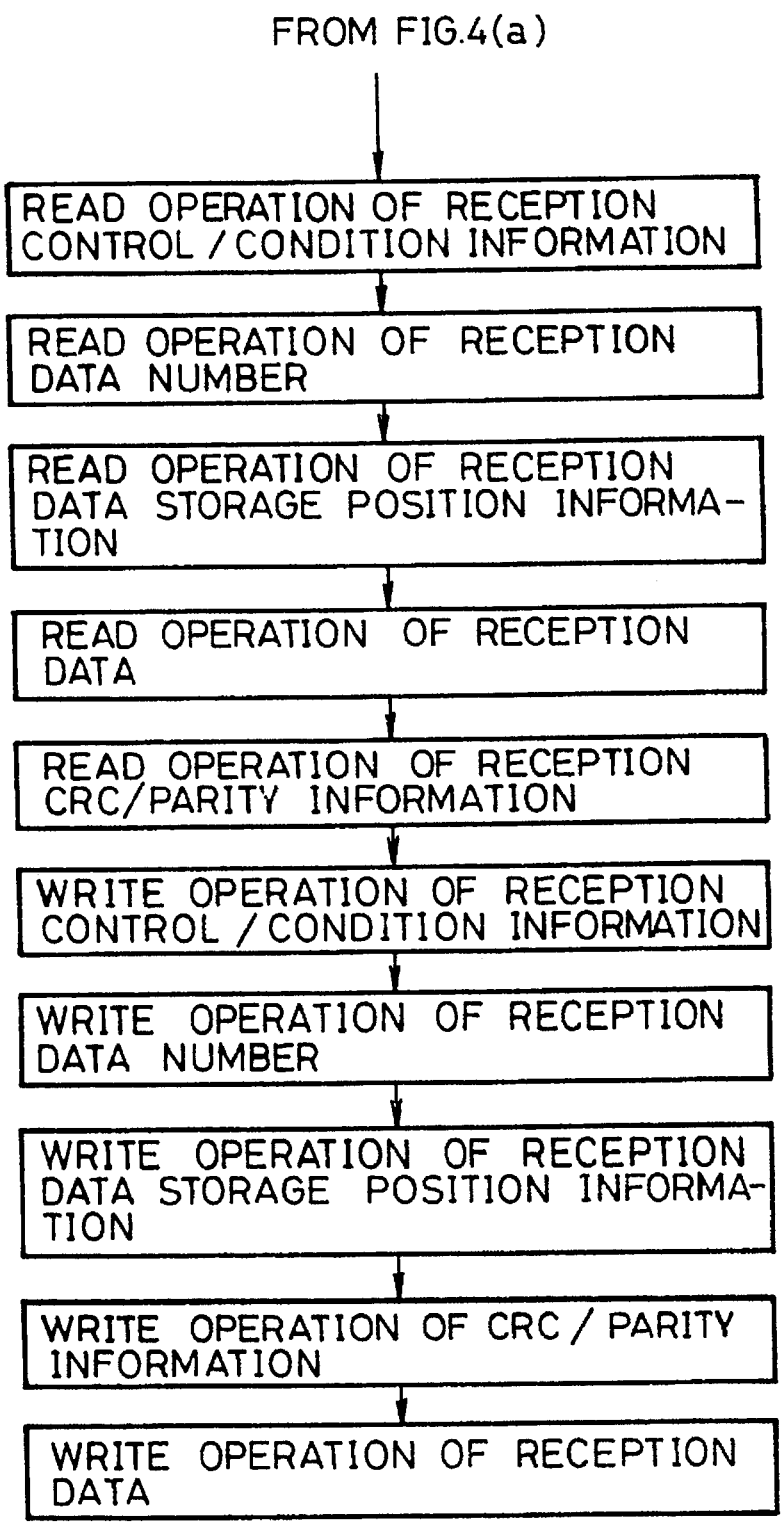
FIG. 4(b) is a diagram explaining an operation sequence of the embodiment.
Figure 5:
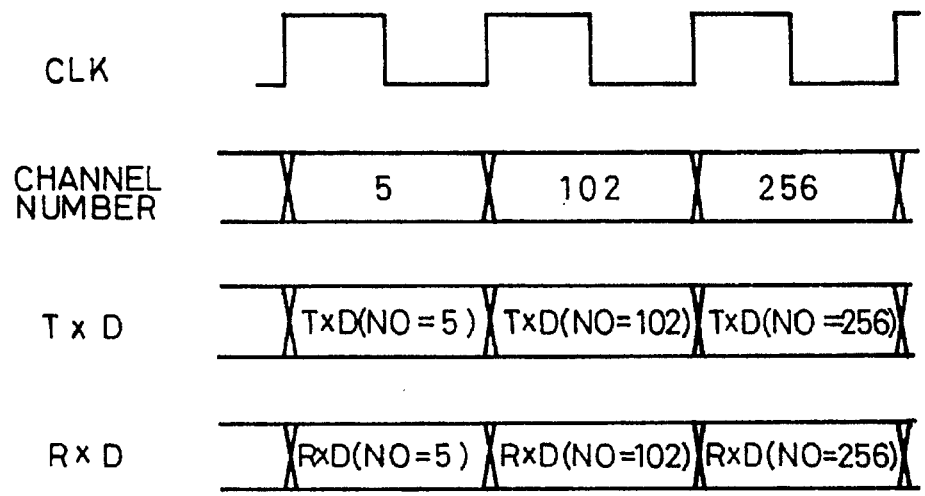
FIG. 5 is a timing chart of the embodiment.

A preferred embodiment of the present invention will be described with reference to the accompanying drawings hereinafter. In FIG. 1, reference numeral 1 represents a communication processing unit to be shared by all channels, and 2 represents a memory for storing control/condition information and transmission/reception data for each channel. FIG. 2 is a block diagram illustrating the functional components of the communication processing unit. FIG. 3 shows the internal configuration of the memory 2 which stores control/condition information for each channel. FIGS. 4(a) and (b) show the operation sequence of this embodiment. FIG. 5 is a timing chart for serial multiplex data and channel numbers.

A description is subsequently given of the operation of this embodiment. In FIG. 1, serial multiplex transmission data (TXD) is output from the communication processing unit 1, and at the same time, serial multiplex reception data (RXD) and a channel number (SEL 7–0) are input into the communication processing unit 1 in synchronism with a clock (CLK). FIG. 5 is a timing chart for these serial communication data and channel numbers. The communication processing unit 1 controls the memory 2 for storing control/condition information and transmission/reception data for each channel, and proceeds with transmission/reception operation while it reads, modifies and writes control/condition information and transmission/reception data for a channel selected by the input channel number (SEL 7–0). The communication processing unit 1 indirectly performs the read operation of control/condition information for each channel from a CPU 1a, that is, access to the memory 2 which stores control/condition information and transmission/reception data for each channel. Therefore, multi-channel data communication is possible as far as the memory capacity and the number of channel number input terminals permit.

A description is subsequently given of FIG. 2. The communication processing unit 1 to be shared by all channels is controlled by the central controller 3. The central controller 3 reads, modifies and writes control/condition information and transmission/reception data for a channel selected by an input channel number while it controls its internal components such as a transmission data selector 4, reception data selector 5, transmission/reception data number counter 6, data storage address counter 7, CRC/parity calculator 8, data multiplexer/separator 9 and address multiplexer 10. The memory 2 which stores control/condition information and transmission/reception data for each channel has transmission control/condition information 12, transmission data number information 13, transmission CRC/parity information 14, transmission storage position information 15, reception control/condition information 16, reception data number information 17, reception CRC/parity information 18, reception data storage position information 19, transmission data 20 and reception data 21 for each channel. Each time the communication processing unit 1 transmits/receives data, each of the above data for a selected channel is modified and written. This is necessary for a single processing unit to handle multiple channels.

An operation sequence will be described with reference to FIGS. 4(a), (b). When a channel number is input, transmission control/condition information is read, and then the number of the remaining transmission data is read. When the number of the remaining transmission data becomes zero, transmission is completed. Thereafter, transmission data storage position information is read and data on the storage position of data to be transmitted is obtained. This data is modified each time data is transmitted so that the storage position of the following data is indicated. The thus obtained position information is then converted into address data to obtain actual transmission data. Thereafter, transmission CRC/parity information is read, a CRC or parity operation is performed, and the information is modified each time data is transmitted. Thereafter, information modified in the above sequence is stored in the memory sequentially. The reception operation is performed in the same sequence as described above.

Embodiment 2

Figure 6:
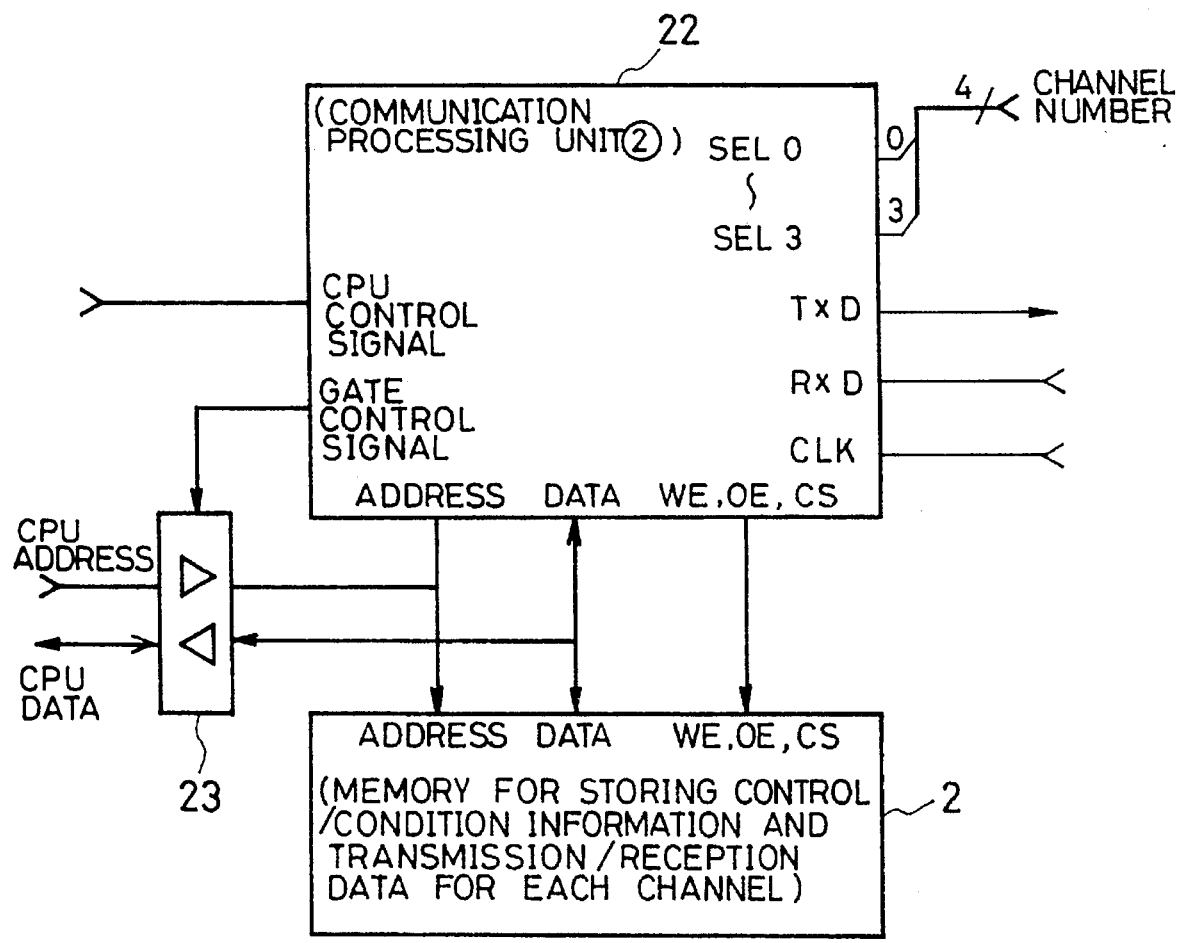
FIG. 6 is a diagram showing the configuration of a multi-channel multiplex communication controller according to another embodiment of the present invention.
Figure 7:
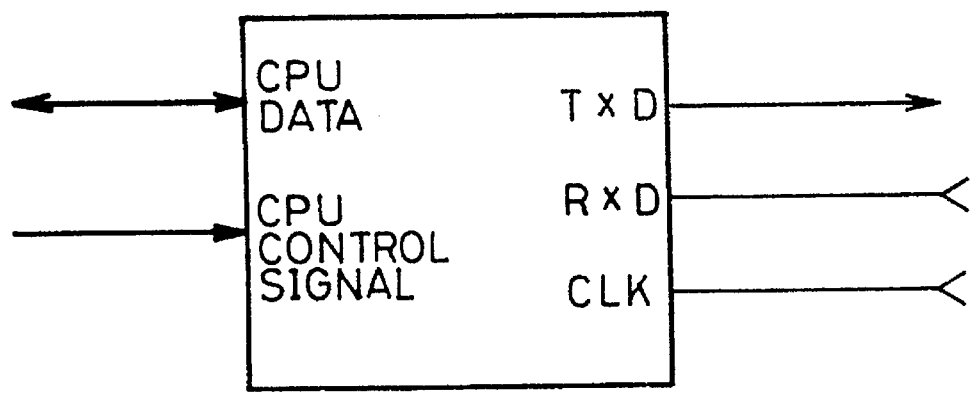
FIG. 7 is a diagram showing an example of a conventional serial data communication controller.
Figure 8:
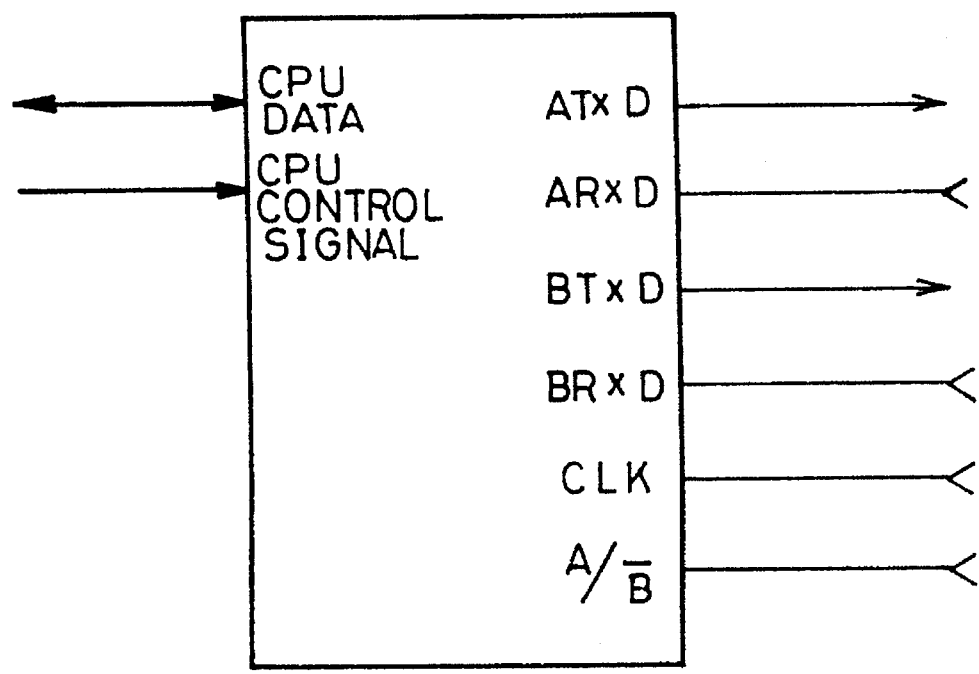
FIG. 8 is a diagram showing another example of a conventional serial data communication controller.

In the above embodiment, the communication processing unit 1 receives a CPU address and CPU data. In FIG. 6, the communication processing unit 1 may receive only a CPU control signal so that a CPU address and CPU data may be controlled by a gate 23. With such a structure, the number of input pins can be significantly reduced. In Embodiment 1, the number of channel input pins is eight and up to 256 channels can be selected, but these numbers may be optionally selected. In FIG. 6, there are 4 channel input pins and up to 16 channels can be selected. Furthermore, in the above embodiment, the present invention is applied to communication based on HDLC and SDLC protocols, but is not limited to this and may be applied to various types of communication without departing from the spirit and the scope of the invention.

As described on the foregoing pages, according to this invention, since serial data are multiplexed, and channel number inputs and a dedicated memory for storing various kinds of information on each channel are provided, the amount of hardware used is less than the prior art when data of multiple channels are handled.

Furthermore, since CPU data and the like can be accessed directly from the memory, it is possible to significantly reduce the number of input pins.

What is claimed is:

1. A multi-channel multiplex communication controller comprising:

a serial data reception unit connected to a single serial data transmission line;

a serial data transmission unit connected to the single serial data transmission line;

a channel selection unit for selecting a channel from among a plurality of channels as specified by a channel number input;

a communication processing unit for controlling data transmission and reception over a channel selected by the channel selection unit by assigning the serial data transmission line to channels selected by the channel selection unit on a time-division basis from among the plurality of channels; and a memory having a storage area for storing communication control data on data transmission and reception operations for each channel, a storage area for storing transmission data for each channel and a storage area for storing reception data for each channel;

wherein the communication processing unit comprises a controller which directly accesses the memory when a channel is selected by the channel selection unit, and which (a) reads communication control data for the selected channel and takes transmission data from the memory based on the communication control data to transmit the transmission data over the selected channel, (b) reads communication control data for the selected channel and receives reception data based on the communication control data to receive the reception data over the selected channel and stores the data in the memory, (c) corrects the read communication control data based on transmission and reception operations after completion of transmission and reception operations and (d) stores corrected communication control data in the storage area of the selected channel in the memory.

2. A multi-channel communication controller according to claim 1, wherein said controller further comprises gates means (23) coupled to said memory (2) and said CPU for enabling said CPU to access said memory responsive to a control signal, and said communication processing unit (1) further comprises a gate control signal output terminal for providing said control signal for controlling said gate means.

* * * * *